United States Patent Office

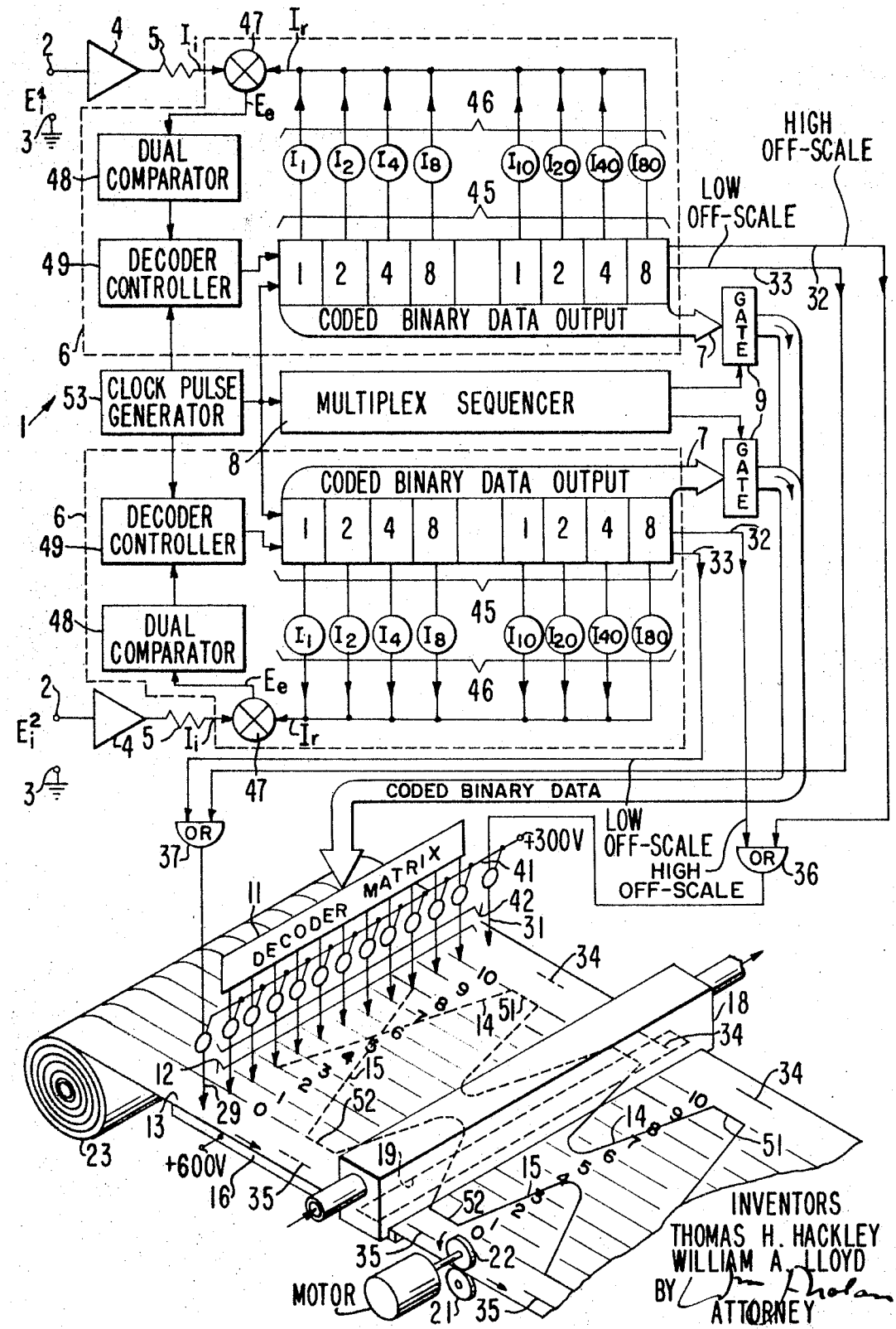

3,465,359
Patented Sept. 2, 1969

3,465,359
ELECTROGRAPHIC RECORDER EMPLOYING MEANS FOR SENSING AND RECORDING INDICIA OF OFF-SCALE INPUT SIGNALS
Thomas H. Hackley, Mountain View, and William A. Lloyd, San Jose, Calif., assignors to Varian Associates, Palo Alto, Calif., a corporation of California
Filed Aug. 21, 1967, Ser. No. 662,102
Int. Cl. G01d 9/00, 15/06
U.S. Cl. 346—23     7 Claims

ABSTRACT OF THE DISCLOSURE

An electrographic recorder is disclosed employing means for sensing and recording indicia of off-scale input signals. The recorder includes an array of electrostatic writing electrodes disposed crosswise over an electrographic recording medium. An input sigal to be recorded is applied to a input channel including an analog-to-digital converter means which tracks the amplitude of the input signals and produces a binary output signal representative of the input signal. The binary output signal is employed for selectively energizing the writing electrodes in accordance with the amplitude of the input signal to be recorded, whereby the trace of the input signal is reproduced on the electrographic recording medium.

In a preferred embodiment of the present invention, the analog-to-digital converter means includes an electronic counter circuit having one output fed back to compare with the input signal to produce an error signal for controlling the count in the counter circuit. Another output of the counter circuit is the binary signal employed for energizing the writing electrode array in accordance with the converted input signal. The counter circuit includes a portion which produces an output when the count in the counter circuit tries to go above or below predetermined amplitude limits corresponding to the scale limits to be traced on the recording medium. These off-scale signals are employed to energize electrodes at the ends of the writing array to produce an indicia on the recording medium of the off-scale condition of the input signal.

Description of the prior art

Heretofore, electrographic recorders have been proposed employing an array of writing electrodes selectively energized in accordance with the amplitude of an analog signal to be recorded. The recorder circuit has included a tracking counter which tracks the amplitude of the input signal and produces a binary output for selectively energizing the proper writing electrodes representative of the amplitude of the input signal to produce a trace of the input signal on the recording medium. Such a recorder is described and claimed in copending U.S. application Ser. No. 582,767 filed Sept. 28, 1966, now Patent No. 3,394,383, and assigned to the same assignee as the present invention. Such a recorder is especially suited for measuring analog input signals having rapid rise and fall times since the recorder includes no moving parts and has essentially no inertia.

Oftentimes, the input signal varies over relatively wide ranges which may exceed the range of scale to be recorded on the recording medium. In such a case it is desirable to provide means for indicating on the recording medium when the input signal is an off-scale condition, i.e., the input signal is above or below the highest and lowest scale on the recording medium. The prior recorder included no means for providing indicia indicatting when the input signal exceeded or fell below the higheest and lowest scale readings on the recording medium.

Summary of the present invention

The principal object object of the present invention is the provision of an improved electrographic recorder including means for sensing and recording indicia of off-scale input signals.

One feature of the present invention is the provision, in an electrographic recorder apparatus having an array of electrographic signal tracing electrodes selectively energized in accordance with the input signal to produce a trace of the input signal on the recording medium, of means for sensing when the amplitude of the input signal is off the amplitude scale on the recording medium and for producing an indicia on the recording medium of the off-scale condition of the input signal.

Another feature of the present invention is the same as the preceding feature wherein the recorder includes a linear array of writing electrodes disposed cross-wise of the recording medium and wherein an off-scale writing electrode is disposed at the end of the linear array with the off-scale electrode being energized in accordance with the sensed off-scale condition of the input to produce the off-scale indicia on the recording medium.

Another feature of the present invention is the same as the preceding feature wherein a pair of off-scale writing electrodes are disposed at opposite ends of the array of writing electrodes, one of the off-scale electrodes being energized when the input signal exceeds the scale on the recording medium and the other electrode being energized when the input signal falls below the lowest scale on the recording medium.

Another feature of the present invention is the same as any one or more of the preceding features wherein the recorder includes an electronic counter circuit as a portion of an analog-to-digital converter arranged to track the amplitude of the input signal and the counting circuit including portions for sensing and producing an output for the off-scale electrode structure when the count in the circuit tries to exceed or fall below certain predetermined signal levels corresponding to the high and low amplitude scale on the recording medium.

Another feature of the present invention is the same as any or more of the preceding features wherein the recorder includes first and second input channels with each input channel having its own analog-to-digital tracking converter tracking their respective input signals and including a multiplexer means for multiplexing the outputs of the analog-to-digital converters to produce essentially simultaneous recordings of the two input signals on the recording medium and the analog-to-digital converters including means for sensing when the input signals are in an off-scale condition and selectively energizing off-scale writing electrodes over the recording medium to produce indicia of the off-scale condition of the input signals being recorded.

Other features and advantages of the present invention will become apparent upon perusal of the following specification taken in connection with the accompanying drawings wherein:

Brief description of the drawing

The drawing is a schematic diagram, partly in block diagram form, of an electrographic recorder incorporating features of the present invention.

Description of the preferred embodiments

Referring now to the drawing there is shown an electrographic recorder 1 incorporating features of the present invention. The recorder 1 includes first and second pairs of input terminals 2 and 3, respectively, to which are applied input signals $E_i^1$ and $E_i^2$ to be recorded. The input signals are amplified by preamplifiers 4 and converted to input currents $I_i$ via resistors 5. The input currents $I_i$, representative of the respective input signals, are applied to analog-to-digital converters 6, more fully described below, which track the analog input signals to produce binary data output signals 7 representative of the amplitude of the input signals $E_i{}^1$ and $E_i{}^2$ to be recorded. In a preferred embodiment, the binary data outputs 7 are coded with a suitable code such as a binary decimal code.

A multiplexer sequencer 8 sequentially gates the binary output signals 7 via gates 9 to a decoder matrix 11 which decodes the coded binary data signals and selectively energizes the proper writing electrode of an array of writing electrodes 12 extending crosswise of an electrographic recording web 13 to produce recorded traces 14 and 15, respectively, of the input signals $E_i{}^1$ and $E_i{}^2$ on the recorder web 13. In a preferred embodiment, the electrographic recording web 13 is electrographic recording paper having a conductive backing and a dielectric charge retentive surface adjacent the writing electrodes 12. The conductive paper backing is disposed adjacent a writing electrode plate 16.

The charge image traces 14 and 15 are developed by pulling the recording web 13 underneath an inking channel 18 through which an electrographic toner is passed at less than atmospheric pressure. An inking slot 19 is disposed in the bottom wall of the inking channel 18 to cause the toner to come in fluid contact with the charge images 14 and 15 to be developed. A motor driven drive wheel 21 grips the electrographic recording web 13 between the drive wheel 21 and idler wheel 22 for pulling the web 13 past the writing array 12 and inking channel 18. The recording web is supplied from a supply roll 23 and the recording web may be preprinted with indicia of amplitude scale as of from 0 to 10 or a separate scale-printing roller electrode may be provided, not shown, for laying down a charge image on the recording web 13 corresponding to the amplitude scale to be printed. A suitable scale printer electrode structure is disclosed and claimed in copending U.S. application 578,801 filed Sept. 12, 1966, now Patent No. 3,392,401, and assigned to the same assignee as the present invention.

A pair of off-scale writing electrodes 29 and 31 are disposed at the ends of the writing electrode array 12 for producing indicia on the recording web 13 when the input signals $E_i{}^1$ and $E_i{}^2$ are of such an amplitude that they fall below or above the amplitude scale on the recording medium 13. Each of the analog-to-digital converters 6 include means for sensing when the amplitude of the respective input signal, to be recorder, is above or below the amplitude scale to be recorded on the recording medium 13. More specifically, each of the analog-to-digital converters 6 includes a high off-scale output 32 and a low off-scale output 33. These outputs 32 and 33 are fed, respectively, to off-scale writing electrodes 31 and 29, respectively, for producing indicia 34 and 35, respectively, on the recording web immediately adjacent the region of the trace 14 and 15 which is in an off-scale condition. A pair of OR gates 36 and 37, respectively, are connected between the high off-scale writing electrode 31 and the low off-scale writing electrode 29 for passing the respective high off-scale and low off-scale outputs to the writing electrodes 31 and 29.

In a preferred embodiment, the signal tracing electrodes 12 lay down an electrostatic charge image on the recording medium 13. In such a case, a writing potential of minus 500 volts is typically required on the writing electrodes 12, 29 and 31 relative to the writing electrode plate 16. A convenient way to obtain the minus 500 volts writing potential is to apply plus 600 volts to the writing electrode 16 and to operate the writing electrodes 12, 29 and 31 at plus 300 volts which is applied via a bus 41. An array of gating transistors 42 are connected for selectively grounding the writing electrodes 12 in accordance with the output signal of the decoder matrix 11. Thus, when the plus 300 volts is applied to the array this is only minus 300 volts relative to the writing plate 16 such that no charge image is deposited on the recording web. When the selected electrode 12 is grounded via the selected gating transistor 42, the potential between that selected electrode and the writing plate is minus 600 volts, thereby exceeding the 500 volt threshold and depositing the charge image on the recording web 13.

Each of the analog-to-digital converters 6 includes an electronic counter circuit 45, preferably of the dual decade type, producing decimal coded binary data outputs, whereby the number of binary units required for the counter circuit 45 is reduced to a minimum. One output of the counter circuit 45 is applied to an array of current generators 46 for producing an output current having an amplitude which varies in accordance with the count in the counter circuit 45. This output current forms a feedback reference current $I_r$ applied to one input of an error detector 47 for comparison with the input current $I_i$ to be measured. The output of the error detector 47 is an error voltage $E_e$ having a phase and magnitude corresponding to the difference between the input signal $I_i$ and the count in the counter circuit 45.

The error signal $E_e$ is fed to a dual comparator 48 wherein it is compared with a pair of reference voltages corresponding to the upper and lower edges of a dead zone having a width preferably about equal to the voltage difference represented by two adjacent writing electrodes 12 and commonly known in the art as the least significant bit. The output of the dual comparator is either an up count command, a down count command or a don't count command which is produced in binary coded form. The binary coded output is fed to a decoder 49 wherein it is decoded and fed to the counter circuit 45 to control the count thereof such that it tracks the input signal $E_i$ to produce a null balance therewith.

The counter circuit 45 includes the capability of producing an output count for each of the electrodes of the writing array 12. For example, if there are 100 writing electrodes 12 corresponding to a count from 0 to 99 on the amplitude scale, the counter circuit 45 will include sufficient binary units to produce the 100 output signals.

In the dual decade counter circuit 45 indicated in the drawing, each decade of the counter includes four binary units connected to produce a binary decimal coded output 7. In such an arrangement, the counter circuit 45 actually has the capability of counting to 128 digits, whereas only 100 digits are required for the writing array 12. The counter circuit is wired such that if the counter attempts to track the input signal to an input signal level greater than the 99th digit it produces the high off-scale output 32 and the counter is wired such that the count in the counter circuit 45 does not advance past the 99th digit. Therefore, the output recording on the recording web, for input signals greater than the scale to be printed on the recording medium, will print the signal as though it were full-scale as shown at 51. Similarly, if the input signal $E_i$ drops to a level below the 0 level to be recorded on the recording web 13 and corresponding to the 0 count in the counter circuit 45, the counter is wired to produce the low off-scale output 33 and the count in the counter circuit 45 does not drop below the 0 count. Thus, for the low off-scale condition of the input signal is recorded at the 0 scale as indicated by 52 and the low off-scale electrode 29 is energized to produce the low off-scale indicia 35.

A clock pulse generator 53 generates a train of clock pulses at a convenient high frequency as of 1 megacycle/second. These clock pulses are fed to the counter circuit 45 and to the multiplex sequencer 8 for correlating the multiplex sequencer 8 with the counting action of the counter circuit 45 such that the counter circuit does not try to count during the time the multiplex sequencer 8 has selected its output to be applied to the writing electrodes 12. A portion of the clock pulse train is also fed to the decoder controller 49 such that the "up" or "down" or "don't count" command to the counter circuit 45 does not change during the time that the counter circuit counts. The plural channel electrographic recorder employing a multiplexer for multiplexing the binary data outputs of two input channels is disclosed and claimed in copending U.S. application Ser. No. 662,103 filed Aug. 21, 1967 and assigned to the same assignee as the present invention.

Although the present invention has been described as employed in a plural channel electrographic recorder the off-scale sensing and indicating means may be employed in single channel recorders by merely deleting the second channel and causing the high off-scale and low off-scale outputs 32 and 33, respectively, to be fed directly to the high and low off-scale writing electrodes 31 and 29, respectively, without the requirement of the OR gates 36 and 37. Also, it is not necessary that binary decimal coded counter circuits 45 be employed, as shift registers and ring counters may be alternatively employed. In case ring counters or shift registers are employed, their outputs are not necessarily coded and therefore the decoder matrix 11 may be deleted in such a case.

What is claimed is:

1. In an electrographic recorder apparatus, means forming an input channel to receive input signals to be recorded, means forming an array of electrographic signal tracing electrodes arranged to be disposed over an electrographic recording medium for recording the input signals thereon, means for tracking the amplitude of the input signal and for selectively sequentially energizing certain ones of said signal tracing electrodes in accordance with the amplitude of the signal to be recorded to produce an analog type trace representative of the amplitude of the input signal on the recording medium, the improvement comprising, means for sensing when the amplitude of the input signal is off the amplitude scale to be recorded on the recording medium and for producing an indicia on the recording medium of the off-scale condition of the input signal.

2. The apparatus of claim 1 wherein said writing array of electrodes is a linear array disposed crosswise of the recording medium, and wherein said means for sensing and indicating an off-scale condition of the input signal includes, means forming an off-scale writing electrode disposed at the end of said linear array of signal tracing electrodes, and means for energizing said off-scale electrode in accordance with the sensed off-scale condition of the input signal to produce the off-scale indicia on the recording medium.

3. The apparatus of claim 1 wherein said writing array of electrodes is a linear array disposed crosswise of the recording medium, and wherein said means for sensing and indicating an off-scale condition of the input signal includes, means forming a pair of off-scale writing electrodes disposed at the opposite ends of said linear array of signal tracing electrodes, and means for energizing said off-scale electrodes in accordance with the sensed off-scale condition of the input signal to produce the off-scale indicia on the recording medium.

4. The apparatus of claim 1 wherein said input signal amplitude tracking means includes, an electronic counter circuit means, producing a first output for energizing selected ones of said signal tracing electrodes in accordance with the count in said counter circuit, said counter circuit means producing a second output for comparison with the input signal to be recorded to derive an error signal for causing the count in said counter circuit to track the amplitude of the input signal, and wherein said means for sensing the off-scale amplitude of the input signal includes a portion of said counter circuit which produces an output when said counter circuit means senses an off-scale amplitude of the input signal.

5. The apparatus of claim 4 wherein said signal tracing array of electrodes is a linear array disposed crosswise of the recording medium, and wherein said means for sensing and indicating an off-scale condition of the input signal includes, means forming an off-scale writing electrode disposed at the end of said linear array of signal tracing electrodes, and means for energizing said off-scale electrode in accordance with the sensed off-scale condition of the input signal to produce the off-scale indicia on the recording medium.

6. The apparatus of claim 5 wherein said off-scale writing electrode means includes first and second electrodes disposed at opposite ends of said linear array of signal tracing electrodes, and wherein said means for sensing the off-scale amplitude of the input signal includes portions of said counter circuit which produce an output when said counter circuit senses a high off-scale amplitude, and means for feeding said high off-scale amplitude output signal to one of said off-scale writing electrodes, and wherein said means for sensing the off-scale amplitude includes a circuit portion of said counter which produces an output when said counter circuit senses a low off-scale amplitude of the input signal, and means for feeding the low off-scale output to the other one of said off-scale writing electrodes for producing an indicia of off-scale condition of the input signal on the recording medium.

7. The apparatus of claim 6 including means forming a second input channel to receive a second input signal to be recorded, means forming an analog-to-digital converter for tracking the amplitude of the second input signal and producing an output for energizing certain ones of said signal tracing electrodes of said array of electrodes in accordance with the second input signal to be recorded, and means forming a multiplexer for sequentially gating the outputs of said first and second channels to said array of signal tracing electrodes to produce essentially a simultaneous recording of both input signals to be recorded, and said analog-to-digital converter means having circuit portions for producing both a high off-scale output and a low off-scale output, and means for feeding both of the high off-scale outputs and both of the low off-scale outputs to said off-scale writing electrodes for indicating when either one of the input signals is in an off-scale condition.

References Cited

UNITED STATES PATENTS

| 2,796,314 | 6/1957 | Bishop et al. | 346—33 |
|---|---|---|---|
| 2,847,268 | 8/1958 | Cowper | 346—14 |
| 2,933,364 | 4/1960 | Campbell | 346—33 |
| 3,394,383 | 7/1968 | Lloyd | 346—32 |

RICHARD B. WILKINSON, Primary Examiner

JOSEPH W. HARTARY, Assistant Examiner

U.S. Cl. X.R.

346—49, 74